United States Patent
Murakami et al.

[11] 3,977,936
[45] Aug. 31, 1976

[54] METHOD FOR THE CONTINUOUS CRYSTALLIZATION OF A SOLID COMPONENT WITH A CENTRIFUGAL FILM EVAPORATOR

[75] Inventors: Ryuzo Murakami; Shigeaki Kato; Yoshihiro Kaya, all of Tokuyama, Japan

[73] Assignee: Shunan Petrochemical Company, Ltd., Tokyo, Japan

[22] Filed: Sept. 9, 1975

[21] Appl. No.: 611,706

Related U.S. Application Data

[63] Continuation of Ser. No. 443,519, Feb. 19, 1974, abandoned.

[30] Foreign Application Priority Data

Feb. 23, 1973 Japan.................. 48-21851

[52] U.S. Cl............................. 159/49; 159/6 WH; 159/6 W; 159/13 C
[51] Int. Cl.².......................................... B01D 1/22
[58] Field of Search............ 159/6 W, 6 WH, 13 C, 159/49; 203/49, 89; 202/236; 260/268 R, 268 T

[56] References Cited
UNITED STATES PATENTS
2,863,888   12/1958   Schurman...................... 159/6 W

*Primary Examiner*—Jack Sofer
*Attorney, Agent, or Firm*—Oblon, Fisher, Spivak, McClelland & Maier

[57] ABSTRACT

A method for continuously crystallizing a solid component by continuously feeding a solution of the solid component in water or an organic solvent to a centrifugal film evaporator equipped with a scraper blade, which comprises feeding the solution from the top of the evaporator which comprises a heating section in the upper stream and a cooling section in the lower stream, forming a film of the solution on the wall of the evaporator, passing the film of the solution down into the heating section in order to evaporate the solvent, discharging the evaporated solvent from an upper outlet by feeding an inert gas or aspirating the solvent vapor in order to prevent the passage of evaporated solvent into the cooling section and contacting the cooling section of the evaporator with the concentrated solution whereby a crystallized solid or a slurry of solid particles is formed.

1 Claim, 1 Drawing Figure

3,977,936

METHOD FOR THE CONTINUOUS CRYSTALLIZATION OF A SOLID COMPONENT WITH A CENTRIFUGAL FILM EVAPORATOR

This is a continuation, of application Ser. No. 443,519, filed Feb. 19, 1974 now abandoned.

BACKGROUND OF THE INVENTION

1. Field of the Invention

The present invention relates to a method for crystallizing a solid material which is dissolved in water or an organic solvent. More particularly, the present invention relates to a process for preparing a crystallized solid or a concentrated slurry in high concentration by cooling a concentrated solution obtained from the evaporation of a solvent by employing a centrifugal thin film evaporator equipped with a heating section, cooling section and a scraper blade.

2. Description of the Prior Art

Heretofore, in order to crystallize a solid from a solution of the solid component in water or an organic solvent, usually the solvent is evaporated to concentrate the solution to a level greater than the solubility of the solid component in the solution or the solution is concentrated by evaporating all of the solvent.

For such operations, a centrifugal film evaporator equipped with a scraper blade (disclosed in Japanese Pat. Publication No. 9311/1960) is usually employed.

In this type of operation, if the melting point of the solid component is less than the evaporation temperature of the solvent or is near the evaporation temperature, for example, a solution of phthalic anhydride (melting point 131.8°C) or maleic anhydride (melting point 52.6°C) in benzene (boiling point 80.13°C), or a solution of piperazine (melting point 106°C) in methanol (boiling point 64.65°C), the solid component in the concentrated solution resulting from the evaporation of the solvent is molten.

A need therefore continues to exist for a process and an apparatus by which a solid component having a melting point below or near the boiling point of the solvent from which it is crystallized can be obtained as a solid or a slurry and not as a molten material.

SUMMARY OF THE INVENTION

Accordingly, one object of the invention is to provide a method for the continuous precipitation of a solid component and to recover the component as an unmolten solid or slurry with a centrifugal film evaporator which is equipped with a scraper whereby the molten component is immediately cooled by evaporation of the solvent.

Another object of the invention is to provide an apparatus and process for the precipitation of solid materials from solution which is more economical and less complicated than known procedures.

Briefly, these objects and other objects of the invention as hereinafter will become more readily apparent can be attained by a method for continuously crystallizing a solid component by continuously feeding a solution of the solid component in water or an organic solvent to a centrifugal film evaporator equipped with a scraper blade, which comprises feeding the solution from the top of the evaporator which comprises a heating section in the upper stream and a cooling section in the lower stream, forming a film of the solution on the wall of the evaporator, passing the film of the solution down into the heating section in order to evaporate the solvent, discharging the evaporated solvent from an upper outlet by feeding an inert gas or aspirating the solvent vapor in order to prevent the passage of evaporated solvent into the cooling section and contacting the cooling section of the evaporator with the concentrated solution whereby a crystallized solid or a slurry of solid particles is formed.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
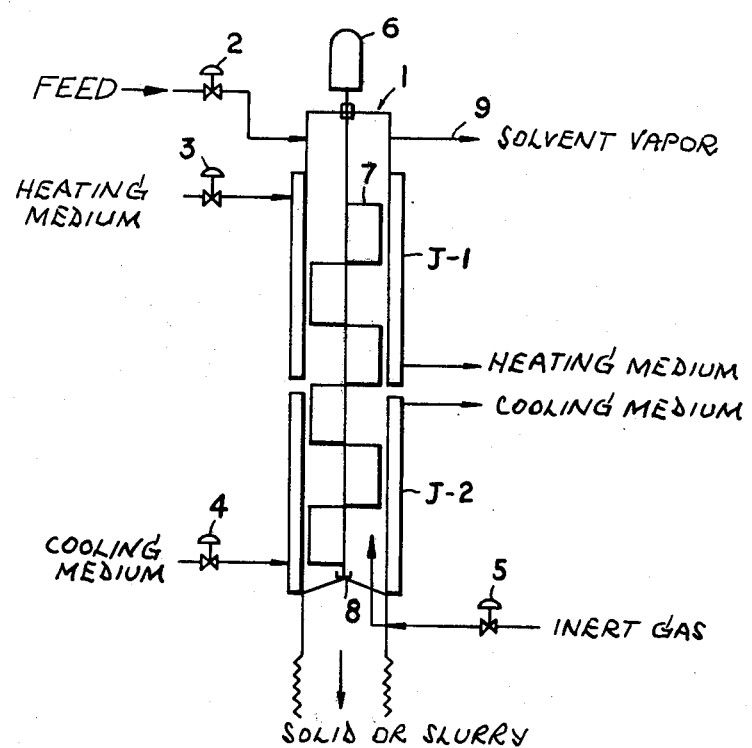
FIG. 1 is a schematic view of the centrifugal film evaporator of the invention which is equipped with a scraper blade, a heating section and a cooling section.

In the process of evaporating the solvent from a solution containing a solid component, the solid can be either an inorganic or organic compound, and is preferably a nontackifying solid.

The centrifugal film evaporator of the invention comprises a heating section and an adjacent cooling section. Alternatively, the two sections may be disposed only slightly apart. In the evaporator the condensation of the solvent vapors which are vaporized in the heating section is prevented from entering the cooling section by admitting an inert gas from a suitable inlet below the heating section or by aspirating the solvent vapor through an outlet for the vapors located above the heating section. The inert gas can be fed into the apparatus from the body of the evaporator, a pipe line or a device below the heating section. The area of heat exchange in the heating section or in the cooling section can be varied depending upon the physical properties of the solution, the quantity of the solution, the quantity of the heating medium or the quantity of the cooling medium and the temperature in the heating section and the cooling section. It is also possible to heat and cool by using a multi-step system to gradually heat or cool the system.

If the difference between the heating temperature and the cooling temperature is high, the concentrated solution is gradually cooled by using the cooling medium with a decreasing temperature, in a multistep sequence from the viewpoint of operation of the evaporator.

The space velocity of the inert gas fed and the solvent vapor, or the velocity of the solvent vapor aspirated in the heating section of the evaporator should be enough to discharge the solvent vapor from the heating section to the outlet at the top of the evaporator. However, the velocity of the inert gas fed or the solvent vapor aspirated should be limited to prevent discharging the resulting dried product from the outlet at the top of the evaporator. The velocity of the inert gas and the solvent vapor can be selected within these limits and can range from 5 m/sec to 0.01 m/sec, preferably 1 m/sec to 0.05 m/sec.

The space velocity is dependent upon the operating conditions, i.e., the quantity of feed of the solution to the evaporator, the solubility of the solid component in the solution, the vapor density of the vaporized solvent, and the like. If the rate of evaporation of the solvent is high, the space velocity of the inert gas or the solvent vapor should be high.

The evaporation of the solvent is affected by the temperature of the heating section. When the solvent vapor is aspirated, the solvent vapor discharged from the outlet of the evaporator can be cooled in order to condense the solvent.

The aspiration is preferably performed by using an ejector or a vacuum pump. When the inert gas is fed, the discharged inert gas along with the solvent vapor is cooled to condense the solvent. The centrifugal film evaporator equipped with a scraper blade used in the process of the invention can be one of the conventional types except that it has a cooling section at the lower stream of the heating section and a means for discharging the solvent vapor from the outlet above the heating section which prevents the flow of the solvent vapor down into the cooling section. The evaporator can be a vertical type or a horizontal type. However, the cooling section should be in the lower stream of the heating section.

The evaporator can be equipped with a plurality of scraper blades, although a single scraper blade type can also be used. The scraper blade can be either a fixed type or a rotary type. Preferably, a vertical evaporator equipped with rotary blades is used.

The temperature of the heating section and the cooling section can be changed by the appropriate choice of the heating medium and the cooling medium, depending upon the type of the solvent and the solid component.

The pressure in the evaporator is not critical and is usually near atmospheric pressure. The pressure can range from high pressures to reduced pressures. Higher pressures can be built up in the evaporator by the input of the inert gas and reduced pressures can be formed by aspirating the air and the solvent vapor. For example, when a methanol solution is used, the heating section is heated to a temperature greater than 64.65°C, preferably greater than 75°C and the cooling section is cooled to a temperature less than 64.65°C, preferably less than 55°C. The difference between the boiling point of the solvent and the temperature of the heating section or the temperature of the cooling section is preferably more than 10°C.

A plurality of inlets can be provided in the evaporator for the inert gas as well as a plurality of outlets for the solvent vapor. The feature whereby the solvent vapor is discharged without condensing it in the cooling section of the evaporator is important for the invention.

A preferred embodiment of the invention is illustrated in FIG. 1, wherein a solution of a solid component dissolved in water or an organic solvent is fed through a control valve 2 to a centrifugal film evaporator 1 which is provided with a scraper blade 7 fitted on a lower bearing 8 and connected to driving motor 6. A heating medium is fed through the control valve 3 to jacket J-1 in order to keep the heating section at a temperature which concentrates the solution. The cooling medium is fed through control valve 4 to the jacket J-2 in order to keep the cooling section of the evaporator at a temperature which cools the solution. The solution (feed stock) fed through control valve 2 forms a thin film on the wall of the evaporator by the centrifugal force of the driving scraper blade whereby a film of the solution is cast against the wall and is concentrated by the evaporation of the solvent from the heat from jacket J-1. The concentrated solution is cooled in the cooling section to crystallize the solid component. In the evaporator of the invention, the backflow of the solvent vapor into the cooling section is prevented by supplying an inert gas through control valve 5 or by aspirating the solvent vapor into the upper section. The crystallized solid or slurry of high concentration which is formed by concentration and then cooling the solution, is continuously scrubbed and removed by the scraper blade.

Having generally described this invention, a further understanding can be obtained by reference to certain specific examples which are provided herein for purposes of illustration only and are not intended to be limiting unless otherwise specified.

EXAMPLE 1

A solution of 50 parts by weight of methanol (boiling point 64.65°C) and 50 parts by weight piperazine (boiling point 148.5°C, melting point 106°C) was continuously fed through control valve 2 to a vertical type centrifugal film evaporator 1 equipped with a scraper blade. The evaporator was equipped with a heating section (heating area 0.15 m$^2$) and a cooling section (cooling area 0.15 m$^2$). The scraper blade of the evaporator was driven by a 1.5 kw motor at a rate of 580 r.p.m. Hot water was fed through control valve 3 to jacket J-1 in the heating section at a rate of 1,000 kg/hr to keep the temperature at about 95°C. Cool water was then fed through control valve 4 to jacket J-2 in the cooling section at a rate of 1,000 kg/hr to keep the temperature at about 30°C. The methanol solution of piperazine was heated in the heating section to evaporate the methanol. The resulting concentrated piperazine solution was cooled in the cooling section to crystallize the piperazine. A small amount of nitrogen gas was fed through a control valve so as to prevent the condensation of the evaporated methanol vapor in the cooling section. Methanol was condensed in the outer condenser to recover methanol at a rate of 22 kg per hour. Powdered crystals of piperazine were obtained from the bottom of the evaporator at a rate of 23 kg per hour. The piperazine crystals contained about 10 parts by weight of methanol, and the methanol was completely removed in the drying step.

EXAMPLE 2

A solution of 50 parts by weight of methanol and 50 parts by weight of triethylenediamine (boiling point 174°C, melting point 160°C) was continuously fed through the control valve 2 to the vertical type, centrifugal film evaporator 1 equipped with the scraper of Example 1 at a rate of 50 kg per hour. Steam having a pressure of 1 kg/cm$^2$ gauge was fed through the control valve 3 to the jacket J-1 in the heating section at a rate of 60 – 70 kg per hour to keep the temperature at about 120°C. Cool water was then fed through the control valve 4 to the jacket J-2 in the cooling section at a rate of 1,000 kg per hour to keep the temperature at about 30°C. As in Example 1 methanol was evaporated and methanol vapor was aspirated from the solvent vapor outlet 9 in the upper section under reduced pressure in order to prevent the flow of methanol vapor into the cooling section. The methanol vapor was condensed in the condenser. Methanol was recovered at a rate of 22 kg per hour and the crystals of triethylenediamine were crystallized and removed from the bottom of the evaporator at a rate of 22 kg per hour. The crystals contained about 10 parts by weight of methanol.

Having now fully described this invention, it will be apparent to one of ordinary skill in the art that many changes and modifications can be made thereto without departing from the spirit or scope of the invention as set forth herein.

What is claimed as new and intended to be covered by Letters Patent is:

1. In a method for the continuous crystallization of a solid material by continuously feeding a solution of the solid material in water or an organic solvent to a centrifugal film evaporator equipped with a scraper blade, an exterior upper heating jacket and a lower downstream cooling jacket, the improvement comprising:

feeding a solution of piperazine in methanol or triethylenediamine in methanol to and down from the top of the evaporator which comprises a heating section for the upper stream and a cooling section for the lower stream;

forming a film of said solution on the wall of the evaporator;

passing the film of said solution on the wall of the evaporator down into the heating section in order to evaporate the solvent;

discharging the evaporated methanol from an upper outlet by feeding an inert gas changed to into the interior of the bottom of said evaporator and through said cooling and heating sections at a velocity of 0.01 m/sec to 5 m/sec in order to prevent the passage of the evaporated methanol into the cooling section; and allowing the concentrated solution to contact the cooling section of said evaporator, whereby a crystallized solid or slurry of piperazine or triethylenediamine respectively, is formed.

* * * * *